United States Patent [19]
Eschbach et al.

[11] Patent Number: 5,317,653
[45] Date of Patent: May 31, 1994

[54] METHOD FOR QUANTIZATION GRAY LEVEL PIXEL DATA WITH APPLICATION OF UNDER COMPENSATED ERROR DIFFUSION

[75] Inventors: Reiner Eschbach, Webster; Keith T. Knox, Rochester; David Birnbaum, Pittsford, all of N.Y.

[73] Assignee: Xerox Corporation, Stamford, Conn.

[21] Appl. No.: 65,088

[22] Filed: May 20, 1993

Related U.S. Application Data

[63] Continuation of Ser. No. 755,380, Sep. 5, 1991, abandoned.

[51] Int. Cl.$^5$ .............................................. G06K 1/38
[52] U.S. Cl. ...................................... 382/50; 358/456; 358/466
[58] Field of Search ............... 382/50, 54; 358/456, 358/466, 465, 455; 340/728

[56] References Cited

U.S. PATENT DOCUMENTS

| | | | |
|---|---|---|---|
| 4,339,7764 | 7/1982 | Temple | 358/283 |
| 4,733,230 | 3/1988 | Kurihara et al. | 358/456 |
| 4,876,610 | 10/1989 | Ohsawa et al. | 382/54 |
| 4,924,322 | 5/1990 | Kurosawa et al. | 358/448 |
| 4,955,065 | 9/1990 | Ulichney | 382/50 |
| 4,969,052 | 11/1990 | Ishida et al. | 382/50 |
| 5,014,333 | 5/1991 | Miller et al. | 358/466 |
| 5,045,952 | 9/1991 | Eschbach | 358/455 |
| 5,077,615 | 12/1991 | Tsuji | 358/456 |
| 5,077,812 | 12/1991 | Kanno et al. | 382/50 |
| 5,130,823 | 7/1992 | Bowers | 358/466 |

OTHER PUBLICATIONS

"An Adaptive Algorithm for Spatial Greyscale", Floyd and Steinberg, Proceedings of the SID, 17/2, 75–77 (1976).

"A Survey of Techniques for the Display of Continuous Tone Pictures on Bilevel Displays", Jarvis et al., Computer Graphics and Image Processing, vol. 5, pp. 13–40 (1976).

"MECCA—A Multiple-Error Correction Computation Algorithm for Bi-Level Image Hardcopy Reproduction", Stucki, IBM Research RZ1060 (1981).

"Images from computers", M. R. Schroeder, IEEE Spectrum, pp. 66–78, Mar. 1969.

"Design of Optimal Filters for Error Feedback Quantization of Monochrome Pictures", Kim et al., Information Sciences 39, pp. 285–298 (1986).

"On the Error Diffusion Technique for Electronic Halftoning", Billotet-Hoffmann et al., Proceedings of the SID, vol. 24/3 pp. 253–258 (1983).

Primary Examiner—Steven P. Klocinski
Attorney, Agent, or Firm—Mark Costello

[57] ABSTRACT

A method and arrangement for the application of under compensated error diffusion to a pixel quantizing method in the conversion of image data from a number of input levels that is relatively large with respect to a number of desired output levels.

1 Claim, 2 Drawing Sheets

METHOD FOR QUANTIZATION GRAY LEVEL PIXEL DATA WITH APPLICATION OF UNDER COMPENSATED ERROR DIFFUSION

This is a continuation of application Ser. No. 07/755,380, filed Sep. 5, 1991 now abandoned.

This invention relates to conversion of images from gray scale pixel values to a reduced number of level of pixel values, using error diffusion techniques that reduce visible artifacts normally noted with error diffusion.

CROSS REFERENCE

Cross reference is made to U.S. patent application Ser. No. 07/672,987 entitled Method for Image Conversion with Application of Multiple Error Diffusion Matrices, filed Mar. 21, 1991, by R. Eschbach, and assigned to the same assignee as the present application.

BACKGROUND OF THE INVENTION

Image information, be it color or black and white, is commonly derived by scanning, initially at least, in a gray level format containing a large number of levels, e.g.: 256 levels for black and white and more than 16 million ($256^3$) levels for color, which is usually unprintable by standard printers. In the following, the term "gray level" is used to described such data for both black and white and color applications. Standard printers print in a limited number of levels, either a spot or a no spot in the binary case, or a limited number of levels associated with the spot, for example, four in the quaternary case. Gray level image data may be represented in a very large number of values. Accordingly, it is necessary to reduce gray level image data to a limited number of levels, so that it is printable. Besides gray level image information derived by scanning, certain processing techniques such as those described for example in U.S. patent application Ser. No. 07/600,542, entitled "Method for Image Conversions With Error Diffusion", by R. Eschbach, produce gray level pixel values which require conversion to a limited set of legal, or correct output values.

One standard method of converting gray level pixel image data to binary level pixel image data is through the use of dithering or halftoning processes. In such arrangements, over a given area, each gray level pixel within the area is compared to one of a set of preselected thresholds, comprising a matrix of threshold values or a halftone cell. The effect of such an arrangement is that, for an area where the image is gray, some of the thresholds within the matrix will be exceeded, while others are not. In the binary case, the portions of the matrix, or cell elements, in which the thresholds are exceeded are printed as black, while the remaining elements are allowed to remain white. The effect of the distribution of black and white over the cell is integrated by the human eye as gray. Dithering presents problems, however, in that the amount of gray within an original image is not maintained exactly over an area, because the finite number of elements inside each halftone cell only allows the reproduction of a finite number of gray levels. The error arising from the difference between the threshold value and the actual gray level value at any particular cell is simply thrown away. This results in loss of image information. Dithering creates significant image artifacts because it ignores this error completely. A well known example is the banding or false contour artifact that can be seen in smooth image areas. Here, the image input gray level varies smoothly over an area while the halftoned image has to make a transition from one halftone dot (gray level) to another. This transition can clearly be seen as a band running through smooth image parts.

Algorithms that convert gray images to binary or other number of level images attempting to preserve gray density exist, and include among them error diffusion, as taught, for example, in "An Adaptive Algorithm for Spatial Greyscale" by Floyd and Steinberg, Proceedings of the SID 17/2, 75-77 (1976) (hereinafter, "Floyd and Stainberg"). Another, more elaborate method would be the error diffusion techniques of U.S. patent application Ser. No. 07/396,272, entitled, "Edge Enhanced Error Diffusion Algorithm" by R. Eschbach and assigned to the same assignee as the present invention. Additional modifications to the error diffusion algorithm taught by Floyd and Steinberg have been proposed, e.g.: a different weighting matrix, as taught, for example, in "A Survey of Techniques for the Display of Continuous Tone Pictures on Bilevel Displays" by Jarvis et al., Computer Graphics and Image Processing, Vol. 5., pp. 13-40 (1976), and in "MECCA—A Multiple-Error Correction Computation Algorithm for Bi-Level Image Hardcopy Reproduction" by Stucki, IBM Res. Rep. RZ1060 (1981). Modifications of the error calculation and weight allocation have been taught, for example, in U.S. Pat. No. 4,924,322 to Kurosawa et. al., U.S. Pat. No. 4,339,774 to Temple, and U.S. Pat. No. 4,955,065, to Ulichney.

Error diffusion attempts to maintain gray by making the conversion from gray pixels to binary or other level pixels on a pixel-by-pixel basis. The procedure examines each pixel with respect to a threshold, and the difference between the gray level pixel value and the threshold is then forwarded to a selected group of neighboring pixels, in accordance with a weighting scheme. The thus corrected image pixels are then considered input to the processing. In this way, the error calculated includes all errors previously made.

An alternative error diffusion procedure is taught in "Images from computers" by M. R. Schröder (sometimes spelled Schroeder) in IEEE Spectrum, pp 66-78 (1969) (hereinafter Schröder). In this method the error is only calculated between the original input pixel and the output, neglecting all previously made errors. This method leads to a poorer gray level representation than Floyd and Steinberg but to higher image contrast. Modifications to the algorithm by Schröder are taught, for example, in "Design of Optimal Filters for Error-Feedback Quantization of Monochrome Pictures" by Jung Guk Kim and Gil Kim, Information Sciences 39, pp 285-298 (1986).

In representing small variations in image appearance with an error diffusion technique, rather large areas of the image are required for the variation to be represented. Thus, while error diffusion is effective in maintaining gray over the image, it requires a rather large area of the image for the error compensation to be effective. Over such areas, undesirable textures and long range patterns, inherent in the distribution of error, may occur.

It is believed that as the number of output levels increases, the need for error correction is reduced. Thus, error correction is essential in quantizing to a binary level, while less necessary for several level systems.

SUMMARY OF THE INVENTION

In accordance with the invention, there is provided a method and arrangement for the application of under compensated error diffusion to a pixel quantizing step in the conversion of image data from a number of input gray levels that is relatively large with respect to a number of desired output levels.

In accordance with the invention, gray pixel values, where the value of the pixel has one of a relatively large number of input levels, are directed through an error diffusion quantization process, for the conversion to one of a relatively small number of values. Each pixel of the gray level data is modified by a correspondingly weighted error correction term or terms from previously processed pixels, generating a modified pixel value. This modified pixel value is compared to a set of threshold values, where the comparison determines that the output will be one of a limited number of output levels. The difference value between the modified pixel value and the output pixel value is distributed in accordance with a weighted distribution scheme through a matrix comprising a set of neighboring unprocessed pixels, increasing or decreasing the gray values of such pixels, which are referred to as modified pixel values. However, only a predetermined portion of the difference error is distributed, so that the effect of the quantizing error is limited. Image appearance is improved by limiting extent of texture variation and long range patterns commonly associated with error diffusion techniques.

In accordance with another aspect of the invention, error may be transferred in the described manner either one dimensionally, to the next pixel in the scan line, or two dimensionally, to a preselected group of pixels including at least one other scan line.

In accordance with yet another aspect of the invention, transfer of about half the quantization error from a single pixel has proven to have aesthetically desirable results for a 5 output levels system. However, the amount of error to be transferred for aesthetic improvement is related to the number of output levels, so that an increasing amount of error distribution is desirable for systems with very few levels of output, while less error distribution is desirable for systems with larger numbers of output levels.

In accordance with still another aspect of the invention, there is provided a method of quantizing gray level pixels, each pixel $I_{n,l}$ defined at one of 256 levels of optical density, where the term 'optical density' will be used hereinafter to describe the set of values comprising the image data, be it density, intensity, lightness or any other image data representation. Each pixel of the gray level data is modified by a correspondingly weighted error correction term or terms $\epsilon_{n,l}$ from previously processed pixels, generating a modified pixel value. This modified pixel value $I_{n,l}+\epsilon_{n,l}$ is quantized to one of five possible output levels using a predetermined distance measure. Usually this is done by comparing it to a set of four threshold values, where the comparison determines that the output value $B_{n,l}$ representing the pixel in consideration will be selected from one of five output levels. The difference value $\epsilon_m$ between the modified pixel value $I_{n,l}+\epsilon_{n,l}$ and the output pixel value $B_{n,l}$ is distributed in accordance with a weighted distribution scheme through a matrix comprising a set of neighboring unprocessed pixels, increasing or decreasing the gray values of such pixels, which are referred to as modified pixel values. However, only a predetermined portion of the error $\epsilon_m$ is distributed, so that the effect of the quantizing error is limited. In accordance with one further aspect of the invention, a first effective error distribution scheme distributes half the quantizing error $\epsilon_m$ to adjacent pixel (n+1,l). In a second effective error distribution scheme half the quantizing error is distributed to a set of pixels in the adjacent scanline, and for pixel $I_{n,l}$, error might be distributed in accordance with $0.125\epsilon_m$ to pixel (n+1, l+1), $0.25\epsilon_m$ to pixel (n,l+1), and $0.125\epsilon_m$ to pixel (n−1, l+1).

These and other aspects of the invention will become apparent from the following descriptions to illustrate a preferred embodiment of the invention read in conjunction with the accompanying drawings in which.

DETAILED DESCRIPTION OF THE DRAWINGS

Figure 2:
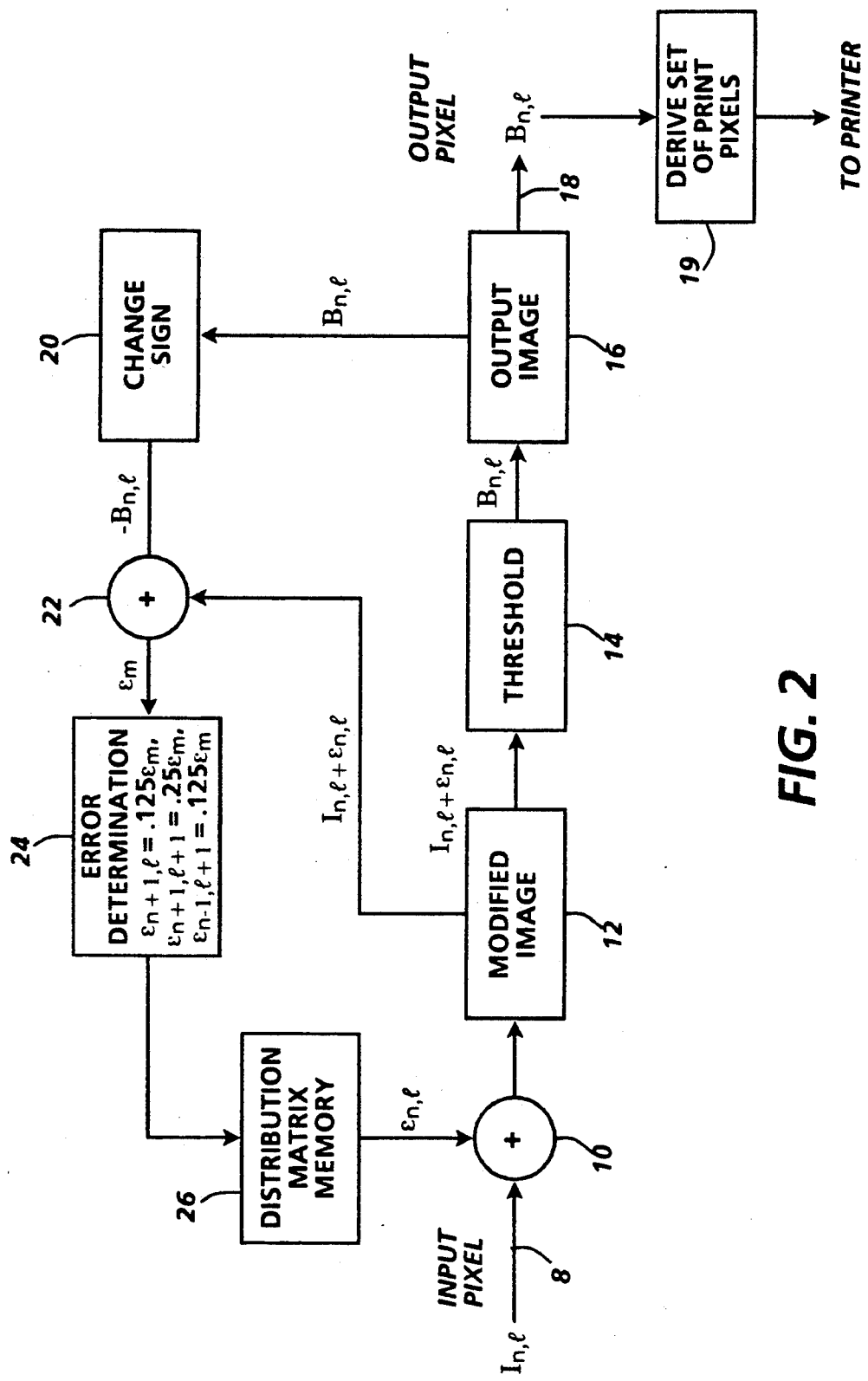
FIG. 2 is a block diagram of a basic system for carrying out one embodiment of the present invention.

Referring now to the drawings where the showings are for the purpose of describing the preferred embodiment of the invention and not for limiting same, a basic system for carrying out the present invention is shown in FIG. 2. In the present case gray level image data from image input 8 is characterized as image data, each pixel of which is defined at a single level in a set of levels, the number of members in the set of levels being larger than desired. Each pixel will be processed in the manner described hereinbelow, to redefine each pixel in terms of a new, smaller set of levels. Here, color data might be represented by a number of independent channels which are handled independently, or the color data might be represented as vectorial data in a predefined color space, e.g.: RGB, CIELab etc., being submitted to vector operations in the thresholding, error calculation and correction. One common case of this method includes the conversion of data from a relatively large set of values to a smaller set of values for printing or other display technique.

An input image of the type to be processed as hereinafter described, may be represented by a series of gray values (gray level pixels) arranged in an array of L lines, each line containing N gray value pixels. As used herein, $I_{n,l}$ refers to a particular pixel in an image at position n, l, and the gray value or intensity level of that pixel. The gray values are typically expressed as integers with one example falling in the range from 0 to 255, although greater or lesser number of levels are possible. An output image is considered to consist of pixels, each pixel corresponding to an output dot or element that is printed by a digital printer. In one embodiment that will be herein considered, image data is derived at 256 levels, and is quantized using the inventive method to one of 5 levels. Then, pulse width modulation is used to convert the 5 levels of image data to a binary output, suitable for printing with an electrostatographic or xerographic laser printing device having binary output. In electrostatographic or xerographic printing devices, the single small dots usually produced using error diffusion are not well reproduced. Using the pulse width modulation method to convert the 5 levels of image data to a binary output allows pixels to be clustered together for better print output. Other methods of quantizing the 5 levels of image data to binary levels, which take into account the values of adjacent pixels, including general dithering, may be used to produce a set of e printer output values, where, in one preferred embodiment the number of members in the set is 2. Of course, the present invention has value independent of such an additional quantization step, particularly in display technologies, and in printing technologies such as ink jet printing, where the print dot can be well reproduced.

With reference to FIG. 2, the image input 8, which may be any source of gray level image data, introduces input image I into the system on a pixel-by-pixel basis. Each input pixel has a corresponding error value $\epsilon_{n,l}$ added to the input value $I_{n,l}$ at adder 10, where $\epsilon_{n,l}$ is the sum of error values of previous pixels, resulting in a modified image, represented by modified pixel values, temporarily stored at block 12. The modified image, the sum of the input value and the error value of previous pixels ($I_{n,l}+\epsilon_{n,l}$), is passed to threshold comparator 14. The modified image data is compared to threshold value(s) T, to determine an appropriate output level $B_{n,l}$ for pixel $I_{n,l}$ and in the present embodiment, which of five levels $B_{n,l}$ will represent the gray level value. The threshold value(s) applied may be constant through the image or may vary either randomly, or in accordance with a dither pattern, as taught in "On the Error Diffusion Technique for Electronic Halftoning" by Billotet-Hoffmann and Bryngdahl, Proceedings of the SID, Vol. 24/3, (1983), pp. 253-258, or in accordance with input information as taught in U.S. patent application Ser. No. 07/396,272 entitled "Edge Enhanced Error Diffusion Algorithm" by R. Eschbach or in accordance with any other predetermined variation. Once output level $B_{n,l}$ is determined and directed to output image storage 16 for eventual transfer to an output along line 18, the value of $B_{n,l}$ is subtracted from the modified image value ($I_{n,l}+\epsilon_{n,l}$) to generate the quantization error level $\epsilon_m$ from quantizing pixel ($I_{n,l}+\epsilon_{n,l}$). A set of print pixels are derived for printing at block 19, which may include the further step of quantizing the desired output set of d optical density values to obtain a set e of printer output values. The subtraction operation is represented by the change sign block 20 and subsequent adder 22, with $\epsilon_m$ representing the difference between the modified image value ($I_{n,l}+\epsilon_{n,l}$) and the output value $B_{n,l}$ for pixel $I_{n,l}$. Error term $\epsilon_m$ is then distributed at error determination block 24 to a predetermined set of neighboring pixels in accordance with the scheme, that the given coefficients $K_1 \ldots K_n$:

$$0 < K_1\epsilon'_m + \ldots + K_n\epsilon'_m < \epsilon_m$$

where $K_1 \ldots K_n$ are coefficients corresponding to the set of pixels to which error will be distributed, for the case of $\epsilon_m$ larger than zero. For $\epsilon_m$ smaller than zero, the "<" symbol is changed to a ">" symbol.

There are several possible implementations of this scheme, two of which will be described here. In the first, the error value $\epsilon_m$ is multiplied by a constant $\alpha < 1$ to generate $\epsilon'_m$, using $$\epsilon'_m = \alpha\epsilon_m \text{ and } \Sigma_i K_i = 1,$$

the second implementation maintains $\epsilon_m$ but uses $$\Sigma_i K_i < 1.$$

The distribution matrix buffer 26 represents the matrix of stored values which will be used as weighting coefficients to generate $\epsilon_{n,l}$ as any pixel n,l that passes.

Figure 1:
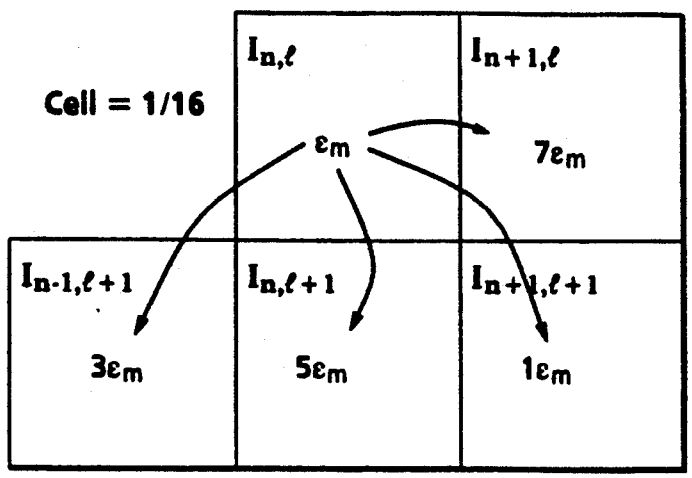
FIG. 1 represents a prior art matrix for error diffusion weighted distribution.
Figure 3A:
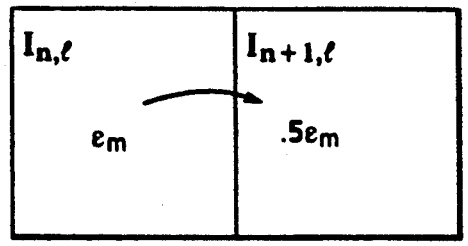
FIGS. 3A and 3B represents examples of two error diffusion matrices appropriate for use together in the reduction of gray levels of image, in accordance with the invention.
Figure 3B:
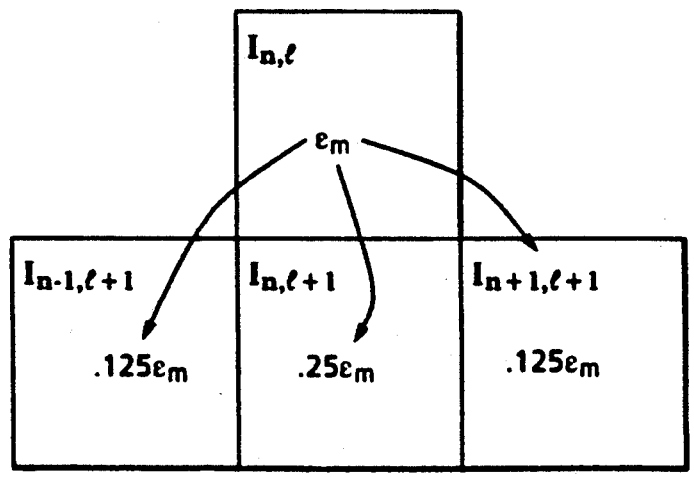

In two example cases, in accordance with the invention, the matrices of FIGS. 3A and 3B show two error distribution arrangements. In FIG. 3A, quantizing error is distributed one dimensionally to the adjacent unprocessed pixel in the scan line in accordance with a weighting scheme in which only $0.5\epsilon_m$ is directed to the adjacent pixel. Considering that pixel $I_{n,l}+\epsilon_{n,l}$ deviates from one of the possible output levels by not more than 12.5%, the error that can be passed is $(0 < |\epsilon_m| < 12.5\%) \times 0.5$, consequently, the error received by pixel $I_{n+1,l}$ is not more than $\pm 6.25\%$ of the total dynamic range of the image, since all the error that is received by this pixel originated at pixel (n,l). The effect of this is to change the level of the next pixel only when that pixel has a value that is very close to a threshold level or decision boundary. In accordance with this effect, the distribution of quantizing error has a limited cascading effect, beyond the initial pixel to which it is directed. Note that the numbers given are for clarity only. The actual deviations depend on the number of levels and the quantization decision.

In FIG. 3B, quantizing error is passed to three neighbors, as in the arrangement of FIG. 2. Therefore for pixel $I_{n,l}$, error might be distributed in accordance with $0.125\epsilon_m$ to pixel $(n+1, l+1)$, $0.25\epsilon_m$ to pixel $(n, l+1)$, and $0.125\epsilon_m$ to pixel $(n-1, l+1)$. Considering that pixel $I_{n,l}+\epsilon_{n,l}$ deviates from one of the possible output levels by not more than 12.5% the maximum error that can be passed to pixel $I_{n+1,l+1}$, is $(0 < \epsilon_m < 12.5\%) \times 0.125$. Any pixel, however, receives error input from three different pixels, i.e. $\epsilon_{n,l}$ the error to $I_{n,l}$ is the sum of error from $I_{n-1, l-1}$; $I_{n, l-1}$; and $I_{n+1, l-1}$. It can be seen that the maximum error received by $I_{n,l}$ is again limited by $0.5 \times (\pm 12.5\%)$. The effect of this is to change the level of the next pixel only when that pixel has a value that is very close to a threshold level or decision boundary. In accordance with this effect, the distribution of quantizing error has a limited cascading effect, beyond the initial pixel set to which it is directed.

It will no doubt be appreciated that there are an enormous number of possible error distribution matrices available in error diffusion processes. What is required by this invention is that a predetermined portion of the error, less than 100%, is passed to the error receiving set of neighboring pixels, for the reason of limiting the area over which an error compensation is attempted.

It will also be appreciated that while the description has referred to five level quantization, the systems which provide multi-level output pixels other than five may use the invention as described with appropriate modifications to the total error feedback to account for the number of pixel levels that can be produced in the output. Additionally, the system can be used to convert color data from a large set of possible color values to a smaller set of color values.

The invention has been described with reference to a particular embodiment. Modifications and alterations will occur to others upon reading and understanding this specification taken together with the drawings. The embodiments are but examples, and various alternatives, modifications, variations or improvements may be made by those skilled in the art from this teaching which are intended to be encompassed by the following claims.

We claim:

1. An arrangement for quantizing pixel values in an image formed by a plurality of pixels, each pixel representing an optical density of the image at a discrete location within the image, and having an original optical density value associated therewith selected from one of a set of c original optical density values that has a number of members larger than a desired output set of d optical density values, the quantizing arrangement comprising:

a source of image data including pixels, each pixel having an original optical density value that is one of c original optical density values;

an adder for determining the sum of a weighted portion of a fractional error term derived from a quantization of at least one previous pixel, and the original optical density value of a current pixel;

a comparator for comparing the sum to at least one reference value, and producing an output value that is a member of the desired output set of d optical density values;

an error term comparator for comparing the output value and the sum, and producing an error term that is the difference therebetween;

means for determining weighted portions of the error term, where a sum of said weighted portions is a preselected fraction of the error term, where said fraction is less than 1 and greater than 0;

a memory storing the weighted portions of the error term to be applied to each original optical density value in a predetermined set of neighboring pixels;

means for applying the weighted portions of the value of said error term to the adder for addition to each optical density value in the predetermined set of neighboring pixels, wherein the predetermined set of neighboring pixels of a pixel n, l, where n is the position of the pixel in scan line l, includes the set of pixels n,l+1, n+1,l+1, and n−1,l+1, wherein the weighted portions are as follows: 0.25 of the error term to pixel (n,l+1), 0.125 of the error term to pixel (n+1,l+1), and 0.125 of the error term to pixel (n−1,l+1).

* * * * *